Aug. 15, 1944. V. F. ZAHODIAKIN 2,355,772
PISTON RING
Filed Sept. 15, 1939
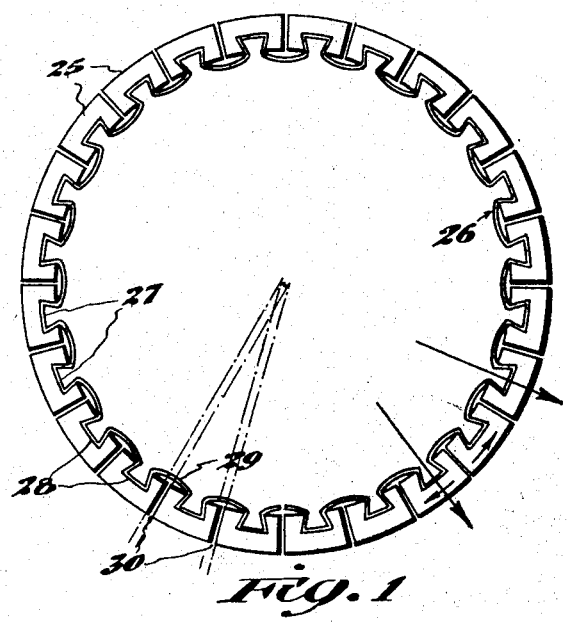
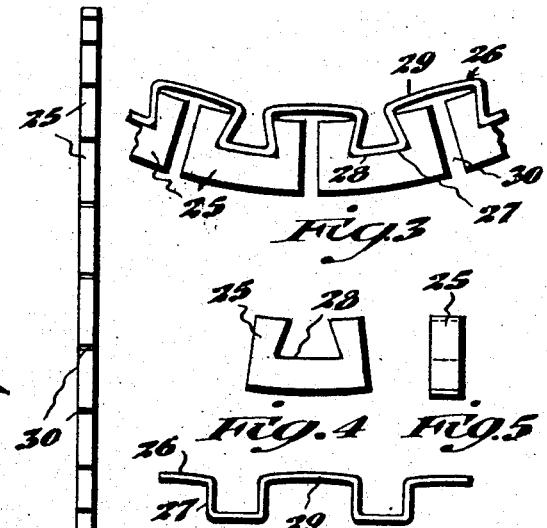
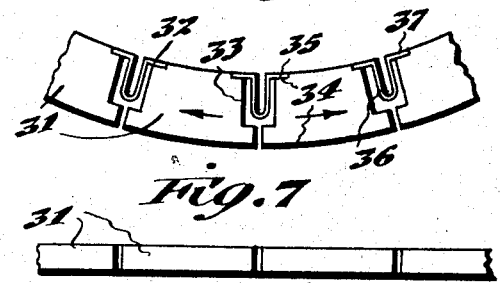
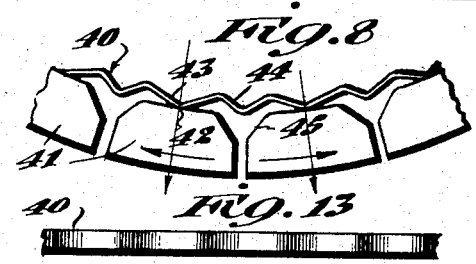
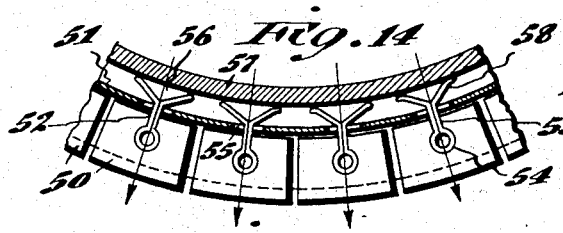
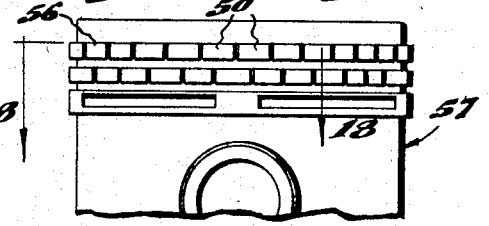
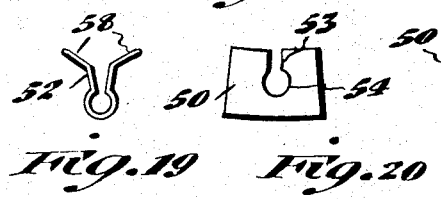
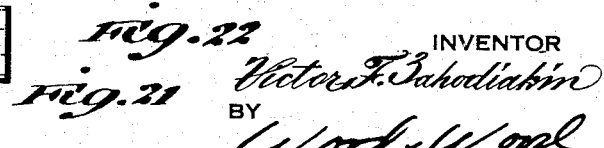
INVENTOR
Victor F. Zahodiakin
BY
Word & Word
ATTORNEYS Patented Aug. 15, 1944

2,355,772

UNITED STATES PATENT OFFICE 2,355,772

PISTON RING

Victor F. Zahodiakin, New York, N. Y.

Application September 15, 1939, Serial No. 295,106

9 Claims. (Cl. 309—29)

This invention relates to improvements in packing or compression rings of the type adapted to be used with pistons. The improved ring of this invention particularly lends itself to use as a compression ring for the pistons of internal combustion engines but is not limited to this use. It is capable of use, with the same advantages, as the packing ring for the pistons of pumps, steam engines, or any installation where packings of this general type are employed.

It has been one of the objects of the present inventor to provide a piston ring adapted to the above uses which will readily and easily conform to any irregularity in the contour of a cylinder, and in this respect is of great value for use in worn cylinders. In other words, the purpose has been to provide a ring which will conform to localized irregularities or distortions as well as to general irregularities.

It has been a further object of the inventor to provide a piston ring which can be made in an extremely simple manner by a few operations of the utmost simplicity. More specifically, the ring may be made by punch press operation and the simple expedient of pressing the ring after stamping.

Specifically described, the present inventor has realized the value of distributing, around the circumference, the normal gap which must be provided in a piston ring to permit expansion and contraction and toward this end has arranged the gap in minute divisions around the entire circumference of the ring. Now to fabricate a ring with these minute clearances has presented an extremely difficult problem.

The concept here has been to provide a ring made up of segments disposed in circumferential arrangement by means which provides, when installed, either radial pressure or circumferential pressure or both. In other words the segments are connected by continuous means or otherwise to constitute a ring providing radial slits distributed around the ring. Thus the ring provides a series of independently flexible segments which may radially adjust themselves to local variations in the contour or the cylinder as well as to general irregularities or variations from a true circle.

The ring thus formed is extremely flexible and may be readily compressed for insertion into the cylinder. It will promptly adjust itself to the irregularities of the cylinder without mechanical fitting of the character required with the rings of the past.

Other objects and certain advantages of the invention will be more fully apparent from a description of the drawing in which:

Figure 1 is a top plan view of the ring removed from the cylinder.

Figure 2 is a side elevation thereof.

Figure 3 is an enlarged fragmentary view of a portion of the ring of Figure 1.

Figure 4 is a top plan of one of the segments.

Figure 5 is the side view thereof.

Figure 6 is a top plan view of a portion of the strip attaching the segments together showing it before it is bent to curvature.

Figure 7 is an enlarged fragmentary view of a modified form of ring.

Figure 8 is a side view thereof.

Figure 9 is a top plan view of one of the segments of the modified form.

Figure 10 is a side view thereof.

Figure 11 is a top plan view of one of the spring means joining the segments.

Figure 12 is a side view of Figure 11.

Figure 13 is an enlarged fragmentary top plan view of a further modification.

Figure 14 is an internal view of the ring of Figure 13.

Figure 15 is a view of one of the segments of the ring of Figure 13.

Figure 16 is a side view of this segment.

Figure 17 is a fragmentary view showing the upper portion of the piston with the rings installed.

Figure 18 is a sectional view taken on line 18—18, Figure 17 showing a further modified ring in position in the piston.

Figure 19 is the top plan view of one of the attachment clips of the segments of Figure 18.

Figure 20 is a top plan view of one of the segments of Figure 18.

Figure 21 is a side view thereof.

Figure 22 is a fragmentary side view of the ring supporting the segments of Figure 18.

It is a general characteristic of the several species of invention disclosed that a multiplicity of segments are joined together to form a complete piston ring. Furthermore, each of these species includes in the connecting means the added function of urging the segments into contact with the cylinder wall.

Describing the forms of the invention disclosed and referring to Figures 1 to 6, the ring is of the following construction: A series of segments 25 are disposed in circumferential arrangement to make up the piston ring. These segments are held together by means of a circular or ring-like clip means 26. This mounting ring 26 is pressed into more or less zig-zag shape as viewed in plan and thus, a series of retainer portions 27 result. These retainer portions, when the ring is complete, have a dove-tail locking engagement in each instance with a dove-tail vertical slot 28 in the back of the segment. The portions of the ring intermediate the attachment portions 27 although generally circumferential are slightly bowed as at 29 so as to be convex on the inside. When the ring is installed in the piston, the spaces 30 between the segments are extremely minute. The split retaining ring is formed of spring metal and shaped so as to provide a circumferential spreading tension on the segments when installed. The curved portions of the retaining ring engage the back of the groove of the piston and thus exert a directly outwardly radial pressure on the segments against the cylinder bore. Obviously, this pressure is local as to each segment.

Now in the form shown in Figures 7 to 12 inclusive the segments indicated at 31 are held in spaced relationship by individual spring clips 32. These clips 32 are disposed within the width and thickness of the assembled ring. For this purpose, each segment has its end faces notched as at 33 back of the contact edge 34 providing clearance for the spring clip. Also an additional notch 35 is provided on the inner periphery of the segment. The spring clip is of U-shape as indicated at 36. It includes attachment legs 37 extended circumferentially and spot welded in respective notches 35. These spring clips are formed and mounted so as to exert a spring action circumferentially when the ring is mounted in the cylinder bore.

In the modification shown in Figures 13 to 16 inclusive the arrangement is quite similar to that in Figure 1 except that the retaining ring 40 holding the segments 41 together is spot welded, as at 42, to the back of each segment. This ring is corrugated so as to exert a circumferential pressure when the ring is mounted in the cylinder bore. Alternate corrugations 43 are spot welded to the segments. Those corrugations 44 between the spot welded corrugations provide the necessary resiliency. The inner adjacent edges of the segments are chamfered as at 45, and provide a clearance for each of the corrugations 44. Thus this ring due to the engagement of certain of the corrugations with the back of the piston groove exerts a directly outward radial force and through other of the corrugations in the retaining ring exerts a circumferential force.

In the modification shown in Figures 17 to 22 inclusive the segments 50 are assembled on a circular ring 51. Each segment is separately attached to the ring 51 by means of the clip 52 which is somewhat like a cotter pin. Each segment includes a notch 53 cut into its inner periphery centrally thereof and including a circular portion 54 centrally of the segment. The clips are formed as shown in Figure 19 so that when compressed they exert an outward or spreading force locking them in position. In assembling the ring 51 they are inserted from the center of the ring outwardly through slots 55 in the ring. They are pressed together and each segment slipped down over the head end so that the head end is disposed in the slot or opening in the segment.

Now when this assembly is placed in the groove 56 of the piston 57 the angular inner ends 58 of the clips engage the inner wall of the groove and exert a directly outward radial force urging each segment against the cylinder wall. Since the segments are confined in the groove, they cannot become displaced from the clips. The normal spreading action of the clips also tends to keep the parts assembled.

The structure disclosed in Figures 18 to 22 is described and claimed in my copending application, Serial No. 339,032, filed June 5, 1940.

The structure disclosed in Figures 7-12 is described and claimed in my co-pending application Serial No. 516,061, filed December 29, 1943.

Having described my invention, I claim:

1. A piston ring comprising, a series of segments and a circumferentially compressible and expansible retaining ring, said retaining ring including integral means attaching each segment thereto, and the segments arranged circumferentially with slight spaces therebetween.

2. A piston ring comprising, a series of circumferentially arranged segments and, a corrugated ring, spot welded around the internal periphery of the segments for holding them in assembly and for providing a circumferential tension when installed in the cylinder.

3. As an article of manufacture, a flexible and resilient piston ring comprising, a plurality of segments, a ring disposed around the inner periphery of said segments, said ring having the segments connected thereto and being formed of corrugated spring metal for generating circumferential and radial pressure.

4. A piston ring comprising, a plurality of segments having dove tail notches in their inner faces and, a circular corrugated element of spring metal, said corrugations providing dove tail locking members engaged in the respective slots for holding the segments in circumferential arrangement.

5. A piston ring comprising, a plurality of segments having dove tail notches in their inner faces and a circular corrugated element of spring metal, said corrugations providing dove tail locking members engaged in the respective slots for holding the segments in circumferential arrangement, the portions of corrugated ring intermediate of the dove tail members being bowed inwardly and constituting spring means engaging the back of the piston groove for exerting radial force on the segments.

6. A piston ring comprising, a plurality of segments, a corrugated ring supporting said segments around its outer face, the corrugations facing adjacent segments and being spot welded thereto.

7. A piston ring comprising, a series of segments, a corrugated ring, said segments disposed around said ring circumferentially, alternate corrugations attached to adjacent segments and the alternate corrugations constituting spring means for circumferential pressure.

8. A piston ring comprising an assembly of elements consisting of circumferentially arranged segments, a supporting ring for supporting said segments in circumferential arrangement, means for fixing each of said segments to said ring, said ring including spring loops adapted to generate both radial and circumferential pressure on the segments when the ring is installed in the cylinder.

9. A piston ring construction comprising a plurality of segments of piston ring material arranged in an annular row, said segments having grooves formed at the inner edges thereof, a resilient connecting member disposed in the grooves of the said segments and secured in clinched relation between the sides of the grooves, said connecting member consisting of a reversely bent element having internal bends, connecting portions and external bends, said connecting portions and bends occurring in a plane at right angles to the axis of the ring, said external bends projecting radially inward from the clinched sides for the purpose of supporting the segments in resiliently compressible relation to one another.

VICTOR F. ZAHODIAKIN.